H. F. Shaw,
Mower.
No. 107,296.  Patented Sep. 13 1870.
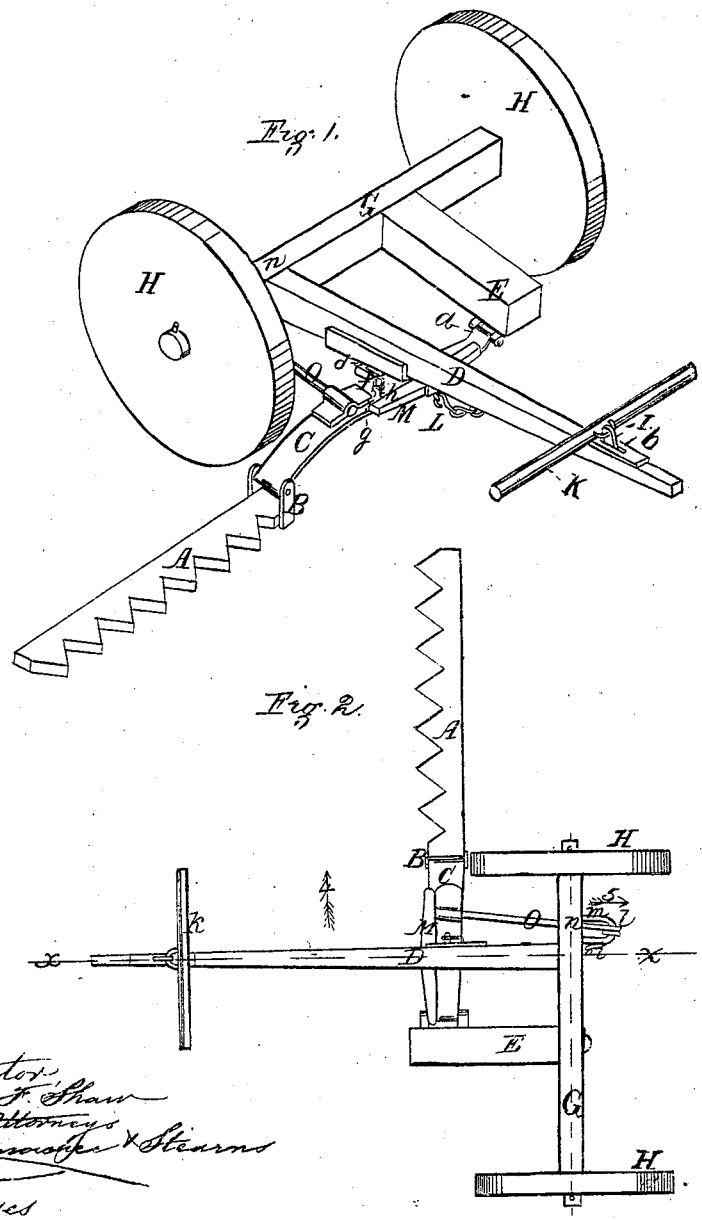
Inventor
Henry F. Shaw
Pr. his Attorneys
Tsichumacher & Stearns
Witnesses
W. J. Cambridge
L. E. Batcheller
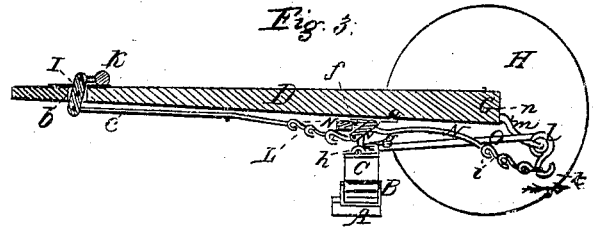

United States Patent Office.

HENRY F. SHAW, OF WEST ROXBURY, MASSACHUSETTS.

Letters Patent No. 107,296, dated September 13, 1870.

IMPROVEMENT IN MOWING-MACHINES.

The Schedule referred to in these Letters Patent and making part of the same.

*To all whom it may concern:*

Be it known that I, HENRY F. SHAW, of West Roxbury, in the county of Norfolk and State of Massachusetts, have invented certain Improvements in Mowing-Machines, of which the following is a full, clear, and exact description, reference being had to the accompanying drawing making part of this specification, in which—

Figure 1 is a perspective view of a mowing-machine with my improvements applied thereto.

Figure 2 is a plan of the same.

Figure 3 is a longitudinal section on the line $x\ x$ of fig. 2, looking in the direction of the arrow 4.

In mowing grass where it is required to change the direction of the draft of the machine to cut a new swarth, it is necessary to raise the finger and cutter-bars from the ground before the horse or horses can back or turn the machine, as the weight of the finger and cutter-bars, if left to drag on the ground, would create considerable friction, which it is desirable to avoid.

The ordinary means employed for effecting this end is by means of a lever operated by the driver from his seat; and to continually work this lever is quite inconvenient and laborious.

The object of my invention is to dispense with the manual labor of working the lever; and consists in mechanism so constructed and arranged that the power exerted by the horse or horses in backing the machine will first elevate the inner end of the finger and cutter-bars from the ground, so that when brought into place they will be released and fall upon the ground in their proper cutting-position, by the horse or horses ceasing to draw backward on the pole; and my invention also consists in mechanism so constructed and arranged that the draft-chain or bar may be pivoted or connected at a point below and in the rear of the center of the axle of the machine, whereby the finger and cutter-bars are raised, and the pole and a portion of the framework thrown or tipped up, when the power of the horses is exerted to draw the machine forward.

To enable others skilled in the art to understand and use my invention, I will proceed to describe the manner in which I have carried it out.

In the said drawing—

A is the finger-bar, the inner end of which rests in a shoe, B, which is pivoted to the outer end of an arm, C, which passes under the pole D, and is hinged at $a$ to a projecting portion, E, of the framework, by which construction the finger-bar may be free to be raised and lowered to conform to the positions required, either at work or when not in use.

G is the axle.

H H are the wheels.

A vertical slot, $b$, is made in the pole near its outer end.

In this slot is pivoted a short lever, I, to the upper end of which is secured the cross-bar or yoke K, to which the collars or breast-plates of the horses are attached.

To the lower end of this lever is secured the outer end of a rod, $c$, connected by a chain, L, to a crank, $y$, on a rocker-shaft, $d$, which vibrates in bearings, $e$, attached to the under side of the pole D.

The arm C is supported from the outer end of another crank, $f$, of the rocker-shaft, by a link, $g$, and staple, $h$.

It will be readily seen from the foregoing description that, when the machine is to be backed and turned, so as to bring the finger and cutter-bars into place for cutting a new swarth, the power exerted by the horses in pulling back on the yoke K, will cause the upper end of the lever to be thrown back against the inner side of the slot $b$, and the lower end of the lever to be thrown forward, and, through the connection previously explained, throwing forward the crank $y$, to which the rod $c$ and chain L are attached, and throwing up the crank $f$, which, consequently, raises the arm C, and with it the shoe B and inner end of the finger-bar, the latter being elevated from contact with the ground, in which position it is easy for the horses to back the machine, in contradistinction to having the friction of the finger-bar and shoe on the ground to overcome; or, of the labor of working a lever to raise them therefrom.

As soon as the finger and cutter-bars are brought up in line for cutting the next swarth, the horses cease drawing back on the yoke or cross-bar K, the lever I, rod $c$, chain L, cranks of the rocker-shaft $d$, and arm C, return to their normal position, and the weight of the shoe and finger-bar A is again supported upon the ground.

The greater portion of the weight of the finger-bar may be lifted from the ground when the machine is ready to cut, by the following means:

To the whiffle-tree M is secured the draft-bar N, which is connected by a chain, $i$, to the lower end, $k$, of a bent rod, O, which is pivoted at $l$ to a staple or eye-bolt, $m$, extending out from below and in the rear of the center of the axle G, the outer end of the bent rod O being secured to the arm C, and serving to support or lift it with the finger-bar when the lower end $k$ of the rod is vibrated on its fulcrum $l$, in the direction of the arrow 5, by the power exerted by the horses to draw the machine forward.

When the finger-bar and shoe are off the ground their weight is borne by the staple $m$ at its fulcrum $l$, the effect of which is similar to that were the weight required to raise them suspended at $l$, which may be considered as one end of a lever whose fulcrum is the center $n$ of the axle, and the pole the other end of the lever, the pole and framework front of the axis being, consequently, raised thereby, relieving so much weight from the necks of the horses.

From the foregoing construction it will be evident that two levers having their fulcrums at $l$ and $n$ are so connected as to produce two results, namely, the raising of the finger-bar from the ground and the tipping up of the pole and a portion of the framework, thereby relieving their weight from the horses necks.

Instead of the construction above described, one side of the pole may be provided with a slot in which a pin, connected with the finger-bar, may be made to move by the power of the horse or horses exerted backward; a longitudinal slot in the pole being also provided, to allow the pole being moved backward on the framework, in which operation the pin ascends the inclined surface of the slot in the side of the pole, thus raising the finger-bar as required.

What I claim as my invention, and desire to secure by Letters Patent, is—

The combination of the shoe B, arm C, short lever I, cross-bar K, rod $c$, crank $f y$, draft-bar N, and rod O, constructed and arranged as described, so that the power exerted by the horse or horses in backing the machine will raise the finger-bar A from the ground, substantially as and for the purpose set forth.

Witness my hand this 16th day of July, A. D. 1870.

HENRY F. SHAW.

Witnesses:
 N. W. STEARNS,
 W. J. CAMBRIDGE.